June 2, 1931.  A. F. WALTZ  1,808,330
TERMINAL CONNECTER
Filed June 29, 1925
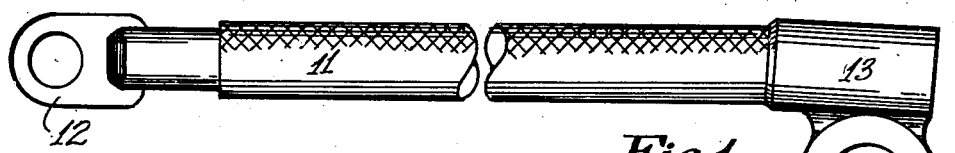
Fig.1
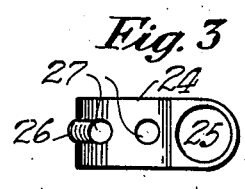
Fig. 3
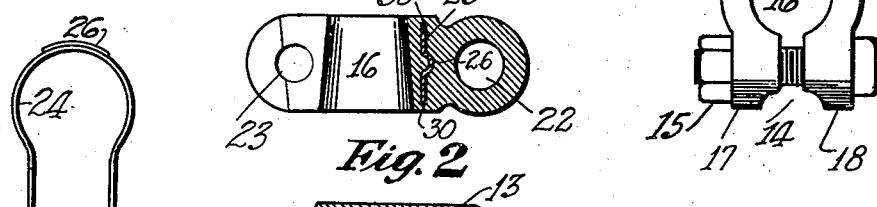
Fig. 2
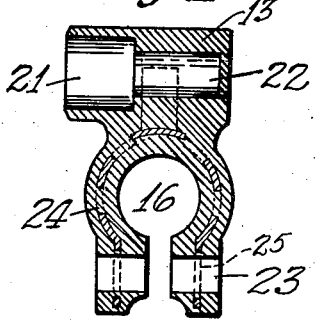
Fig. 6
Fig. 4
Fig. 5
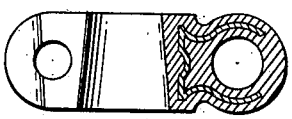
Fig. 8
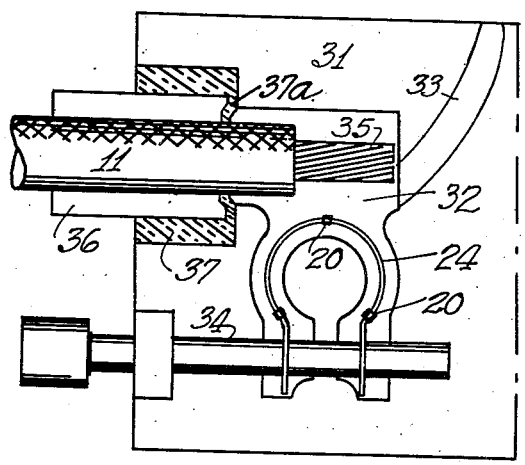
Fig. 7
INVENTOR.
Anton F. Waltz,
BY
ATTORNEY.

Patented June 2, 1931

1,808,330

UNITED STATES PATENT OFFICE

ANTON F. WALTZ, OF BROOKLYN, NEW YORK, ASSIGNOR TO KOSCHERAK SIPHON BOTTLE WORKS, OF HOBOKEN, NEW JERSEY, A CORPORATION OF NEW JERSEY

TERMINAL CONNECTER

Application filed June 29, 1925. Serial No. 40,438.

This invention relates to a wire terminal and to the process of making the same and it has particular reference to a terminal suitable for storage batteries. An object of the invention is to provide a connecter for storage batteries which makes a perfect contact, which is rigid, which has a spring clamping jaw and which is moulded from lead or similar alloy. Another object of the invention is to mould a terminal around the insulation of a wire without injury to the wire or moulded product. These and other objects of the invention will be more particularly understood from the following specification and the accompanying drawings, in which, Fig. 1, is a plan view of the terminal connecter complete, Fig. 2 is a vertical cross-section of the terminal, Fig. 3 is a form of spring filler moulded into the terminal, Fig. 4 is another view of the spring shown in Fig. 3, Fig. 5 is a modified form of spring for the same purpose as Fig. 3, Fig. 6 is a longitudinal cross-section of the terminal showing the spring filler in place and Fig. 7 shows part of the mould and the process of manufacture of this terminal.

Fig. 8 is a sectional view taken through the center of Fig. 6, so as to show the position of the parts 28, with respect to the conducter.

The difficulty in securing reliable connections to storage battery terminals is well known. Corrosion of the terminal is the most common trouble. This arises from the fumes of the electrolyte of the battery corroding the metal of the terminal, or from an electrolytic action set up in the terminal as the current flows therethrough in presence of the fumes from the battery.

This has brought about the general use of lead terminals which are burned or clamped to the lead post of the battery. Lead has the advantage of being non-corrosive and being of a material similar to the battery itself electrolytic action cannot take place.

While lead terminals have these advantages, they are mechanically weak and when used for detachable terminals after a few applications they lose their life and cannot be effectively clamped in place. Further, lead is subject to crystallization under vibration so that when terminals of this character are used on automobile storage batteries their life is limited owing to the vibration they receive in use. To overcome these difficulties I mould into a lead terminal a flat band of spring steel which is entirely enclosed by the lead. This gives rigidity and a spring action to the jaws of the clamp and enables the clamp to take a grip as strong as the steel band itself.

Referring to the drawings, 11 is an ordinary stranded wire with a waterproof braided insulation which is provided with the lug connecter 12 at one end and is moulded into the thimble 13 of the clamp connecter 14 at the other end. The core 16 is tapered as shown in Fig. 2 to fit the stem of the battery. The clamp is formed around the core by the jaws 17 and 18 which are clamped by the lead coated bolt 15.

The thimble 13 has an enlarged section 21 for the insulation and a section 22 which is moulded around the strands of the conducter. The jaws of the clamp are provided with an aperture 23 as shown in Figs. 2 and 6 for the bolt 15. The spring filler, as shown in Fig. 3 comprises the band 24 which is provided with a rib at 26 to increase its rigidity and to form a corrugation for engaging the moulded metal. The ends of the spring are perforated as at 25 with a hole somewhat larger than aperture 23 and are located so as to register with 23 as indicated in Fig. 6. In the construction shown in Fig. 5, the spring has lugs developed therefrom and turned in the opposite direction to the jaws as indicated at 28. These lugs surround the stranded cable in the pocket 22 and thus carry the steel reinforcing band from the clamping bolt 15, around the core 16 to the strands of the conducter 11. The filler 24, as indicated at 29, Fig. 2 is spaced from the surface of the lead terminal as indicated at 30 so that a complete lead terminal is secured internally reinforced by spring steel.

As before stated, the perforations 25 in the end of the band are somewhat larger than the holes or perforations through the clamping jaws, the result being that the moulded metal is also bonded together through the perforations 25, thereby aiding in the prevention of the separation of the moulded metal along the edges of the band and at the same time protecting the band from being attacked by corrosion at the inner edges of the perforations 25.

The perforations 27 have, of course, the effect of reducing somewhat the stiffness of the spring 24, but this is compensated for to some extent by the rib or corrugation 26 so that notwithstanding the perforations the spring will still be stiff enough to fulfill its purpose.

In normal unattached condition the jaws of the clamp are separated or spaced apart as shown in the drawings. In making a connection the connecter is placed so that the core or opening 16 surrounds the battery post and the bolt 15 is then tightened. The wide spring acts to draw substantially all portions of the interior of the opening 16 into close engagement with the exterior of the battery post, thereby effecting ideal contact conditions. This can all be done without pounding the lug down on the post. Such pounding might cut through the lead at 30 to expose the edges of the spring to corrosive action which would rapidly extend to destroy the spring.

By having the spring covered at all points by the moulded non-corrosive metal, the spring is maintained indefinitely in resilient condition, so that when it is desired to disconnect the battery the spring will act to move the clamp jaws apart when the bolt 15 is loosened. This makes it possible to lift the clamp from the battery post instead of being compelled to pound or pry it off. Pounding or prying would, of course, involve the possibility of breaking through the protective lead coating and subjecting the spring to corrosion in subsequent use.

In order to serve its purpose to the best advantage, it is preferred to form the band 24 from flat spring stock which is wide enough to cause it to draw the lead clamp jaws together so that all parts of the port hole 16 will grip the battery post when the clamp is tightened. When such a wide band is used, however, its edges lie so near the surface of the moulded metal, as shown at 30, that there is danger of the metal breaking through adjacent the edges of the band when the jaws are flexed, thereby permitting the inner portion of the metal to separate from the outer portion and spoiling the clamp. In order to prevent this from occurring, the band may be cut away as at 27 to form clearances or perforations through which the metal will flow to form bonds between the metal at the opposite faces of the band and thereby relieve the thin portions 30 of the metal from damaging strain when the clamp is operated.

The process of manufacture is outlined in Fig. 7. The mould 31 is recessed to the form of the terminal as at 32 and is provided with a gate 33. The plunger 34 forms the core 23 in the jaws and is threaded through the holes 25 in the spring band 24. This band may be spaced from the mould by cleats 20 so that the moulded metal can flow around and entirely surround the band. These cleats are preferably made of lead so that they fuse into the metal of the mould.

The insulation of the conductor 11 is removed to expose the strands 35 which projects into the mould as shown through the tube 36, this tube being shielded from the heat of the mould by the asbestos packing 37.

The conductor 11 is braided and treated with a waterproofing compound of asphaltum which liquefies under heat. In the present construction the molten metal flows into the mold and solidifies rapidly after which it is removed and quenched in water so that the heat may not spread through the stranded conductor 35. It is found in practice that by keeping the tube 36 fairly cool, the metal will flow around the insulation and solidify before the asphaltum compound begins to flow thus securing a terminal in which the conductor is thoroughly protected by insulation and in which a moulded connection is obtained between the terminal and the conductor.

Having thus described my invention, I claim:

1. A heavy duty terminal connecter as described comprising a pair of clamping jaws made from moulded non-corrosive metal and having perforations to receive a clamping bolt and a spring band formed to the contour of said jaws embedded in said jaws having perforations aligning with but of larger diameter than the perforations in said jaws and having their edges covered by said moulded metal.

2. A terminal connecter as described molded from non-corrosive metal comprising a thimble formed to receive a conductor and having a pair of clamping jaws and a spring band blanked from sheet stock formed to the contour of said jaws and embedded therein and having a portion bent in the opposite direction to said jaws formed to the contour of and embedded in said thimble.

3. A battery connecter comprising a flexible conductor having an insulating cover and a bared end portion, a thimble of non-corrosive metal moulded around said bared end and the adjoining end portion of the insulating cover, a clamp of non-corrosive metal moulded integral with the thimble comprising a pair of clamping jaws constructed to engage a battery post and perforated near their ends to receive a clamping bolt, a spring constructed from flat stock enclosed in the moulded metal of the clamp and formed to correspond with the contour of the clamp jaws, said spring having a stiffening rib around its bow and cut away portions through which the moulded metal is bonded together including a pair of perforations aligning with and of larger diameter than the perforations through the clamp jaws.

4. A battery connecter comprising a flexible conductor having an insulated cover and a bare end, a thimble of non-corrosive metal moulded around said bare end and an adjacent end portion of the insulating cover, a clamp of non-corrosive metal moulded integral with the thimble comprising a pair of jaws suitably constructed to engage a battery post and perforated near their ends to receive a clamping bolt, a reinforcing band fully enclosed by the moulded metal of the clamp and constructed to conform to the contour of the clamp jaws, said band having a plurality of perforations through which the moulded metal is bonded together including a pair of perforations aligning with the perforations through the clamp jaws.

5. A heavy duty terminal connecter as described comprising a clamp moulded from non-corrosive metal having clamping jaws normally separated to engage freely a battery post, and perforated near their ends to receive a clamping bolt, a spring band constructed to conform to the contour of the clamp jaws embedded in the clamp and provided with perforations in alignment with the perforations in the jaws and through which the moulded metal is bonded together, and a clamping bolt operable to tighten the clamp and place said spring under tension.

6. A terminal connecter as described molded from non-corrosive metal, comprising a thimble formed to receive a conductor and having a pair of clamping jaws, and a spring blanked from sheet stock, formed to the contour of said jaws and embedded therein, and having a portion bent in the opposite direction to said jaws formed to the contour of and disposed within said thimble.

Signed at New York, in the county of New York, and State of New York, this 25th day of June, 1925.

ANTON F. WALTZ.